United States Patent Office 3,504,031
Patented Mar. 31, 1970

3,504,031
1-AMINOALKYL-1-PHENYLINDENE PROCESS AND INTERMEDIATE THEREFOR
James M. Berdahl and Robert F. Majewski, Evansville, Ind., assignors to Mead Johnson & Company, Evansville, Ind., a corporation of Indiana
No Drawing. Filed May 24, 1966, Ser. No. 552,407
Int. Cl. C07c 87/28, 85/02
U.S. Cl. 260—570.8    11 Claims

ABSTRACT OF THE DISCLOSURE

A process for the preparation of a 1-aminoalkyl-1-arylindene which comprises reacting a dimetallo salt of a 3-arylindan-1-ol with one molecular proportion of an aminoalkyl ester in an inert reaction solvent in contact with a reaction inert atmosphere at a temperature of from about room temperature to about —60° C. under anhydrous conditions and thereafter neutralizing or or hydrolyzing the resulting salt of the 3-aminoalkyl-3-arylindan-1-ol and then dehydrating said indanol.

---

The 1-aminoalkyl-1-arylindenes having Formula I and the corresponding 1-aminoalkyl-1-arylindanes, Formula II, which are prepared from the indenes by hydrogenation, are known to possess biological activity. Refer, for example, to U.S. Patent No. 2,798,888 of Hellmut Ueberwasser. The present invention provides an improved process for the synthesis of the indenes of Formula I, and intermediates therefor.

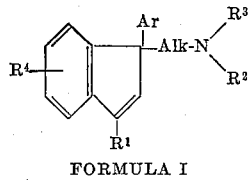
FORMULA I

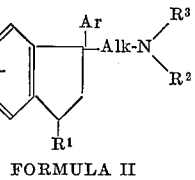
FORMULA II

In these formulas Ar is phenyl, halophenyl, alkyl- or dialkylphenyl, alkoxy- or dialkoxyphenyl, and $R^4$ is hydrogen, chloro, bromo, alkoxy, alkyl, or dialkoxy, wherein each alkyl or alkoxy group has up to four carbon atoms. $R^1$ is hydrogen, phenyl, or alkyl having up to about six carbon atoms. Alk is an alkylene group, straight or branched, having two to three carbon atoms with two to three carbon atoms thereof separating the nitrogen atom from the ring. $R_2$ and $R_3$ are alkyl or alkenyl groups having up to six carbon atoms.

According to one widely applied method known for the preparation of the indenes of Formula I, an alkali metal salt of $1-R^1$-3-arylindene or isomeric $3-R^1$-1- arylindene, Formula III, is condensed with a dialkylaminoalkyl halide in the presence of an inert solvent under anhydrous conditions. Refer to the following reaction scheme in which the symbols have the same meaning as before.

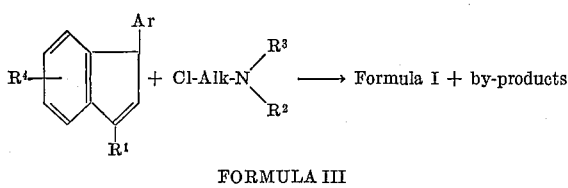
FORMULA III

This method suffers from the disadvantage of affording a mixture of products which contains in addition to the substance of Formula I, various by-products including substances isomeric with Formula I such as

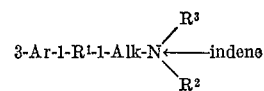

in which the Ar and

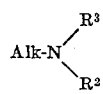

groups are attached to different carbon atoms rather than to the same one as in Formula I. Relatively low yields of the desired material are obtained by this method and only after completing laborious procedures for separation and purification. Refer, for instance, to S. J. Dykstra et al., Abstracts of Papers of the 149th Annual Meeting of the American Chemical Society, April 1965, page 17N, and to C. R. Ganellin et al., Chemistry & Industry, page 1256, July 10, 1965.

According to the present invention, there is now provided a method for the preparation of the substances of Formula I which is unambiguous with reference to the structure of the product produced, which can be efficiently and conveniently carried out in ordinary equipment, which affords exceedingly high yields, and in which the product is obtained uncontaminated by undesired by-products. This method is based upon our discovery that the 3-arylindan-1-ols of Formula IV can be alkylated exclusively at the 3-position of the indene ring, that is in the position at which the aryl substituent is attached, if a dimetallo salt thereof is allowed to react with the alkylating species according to the following reaction scheme. The resulting 3-aminoalkyl-3-aryl-indan-1-ol of Formula VI is then dehydrated to provide the product of Formula I. Again the same meaning is intended for $R^1$, $R^2$, $R^3$, $R^4$, Ar, and Alk. X is a reactive ester group (tosylate), and M is sodium or potassium.

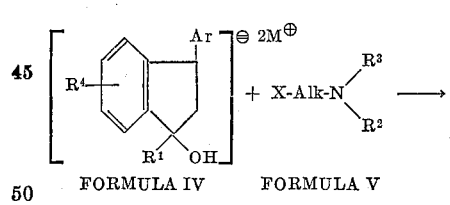
FORMULA IV    FORMULA V

FORMULA VI

Selective alkylation at the 3-position as illustrated is such as Cl, Br, alkylsulfonate (mesylate), or arylsulfonate dependent upon selection of the proper reaction conditions which are set forth below. Such selectivity is quite unexpected in view of the report by N. Borovicka and M. Protiva, Chem. Abstracts 52, 1125e (1958), where the same reactants under different conditions resulted in O-alkylation with the formation of an indanyl ether. According to our method, undesired ether formation is eliminated and the carbon alkylated materials of the desired structure are obtained in high yield.

The disodium or dipotassium salt of the 3-arylindan-1-ol starting material of Formula IV is preferably prepared in liquid ammonia. The invention in its broad concept is not limited to any specific manner of preparing the dimetallo indanol intermediate, however. Sodium amide or potassium amide is first formed by reacting sodium or potassium metal with liquid ammonia. The volume of liquid ammonia is not critical and the optimum amount for a given-sized run can readily be determined by trial and error. Factors to be considered in selection of the volume of liquid ammonia, and other solvents, include solubility of the reactants, size of available equipment, and the ease of distilling or otherwise removing and recovering the solvents if desired. Sodium amide and potassium amide have been prepared on a commercial scale and material so prepared is satisfactory for the present process. Under laboratory conditions we have found it convenient to use from about 3 to 5 liters of liquid ammonia per gram atom of sodium.

The dimetallo salt corresponding to Formula IV is then formed by addition of the 3-arylindan-1-ol to the liquid ammonia suspension of sodium amide or potassium amide. This is preferably done by preparing a solution of the indanol in an inert organic solvent such as ether, and adding the solution gradually to the sodium or potassium amide suspension. The disodium and dipotassium salts of Formula IV are bright red in color and their formation is readily observed. One molecular proportion of the reactive aminoalkyl ester of Formula V is then added to the liquid ammonia suspension.

After preparation of the disodium or dipotassium salt of the indanol of Formula IV, it is not essential to complete the remainder of the process in liquid ammonia as reaction medium, although it is preferred to operate in this fashion. For a large-scale operation, it may be desirable to prepare the disodium or dipotassium salt of Formula IV as a preliminary step and to then bring about reaction with the aminoalkyl ester in a different solvent medium.

As the aminoalkyl ester, Formula V, is mixed with the cold solution or suspension of indanol dimetallo salt, the red color thereof is immediately discharged, signifying completion of the reaction. The aminoalkylindanol (Formula VI) is then recovered if desired, after neutralization or hydrolysis of the resulting monosodium salt thereof. Alternatively dehydration directly to the indene of Formula I can be carried out in situ after acidification.

The precise structural character of the dimetallo salt, Formula IV, has not been determined, but it is believed that the alcoholic hydroxyl hydrogen atom and the benzhydryl hydrogen atom in the 3-position are the acidic protons which are involved in salt formation. These salts are reactive with the oxygen and carbon dioxide of the atmosphere and are readily hydrolyzed upon contact with water. Therefore, an important feature of the process involves exclusion of atomspheric oxygen and carbon dioxide from the reaction zone by use of reaction inert dry solvents, a dry inert atmosphere in contact with the reaction mixture, and generally practicing techniques consistent with anhydrous operation.

A variety of alkylating species may be selected for introduction of the side chain. For preparation of the aminoalkyl compounds with which this invention is concerned, we prefer the aminoalkyl chlorides, bromides, iodides, and other reactive esters of Formula V. The alkylsulfonate esters, such as the mesylate and the arylsulfonate esters, such as the tosylates, are also useful. Others include ethanesulfonate, butanesulfonate, benzenesulfonate, etc., and yet others may be selected by those skilled in the art since many alkylating agents for the introduction of aminoalkyl substituents are known.

The chemical reaction involved in the novel process illustrated above is virtually an instantaneous one which occurs on mixing one chemical equivalent of the reactive ester of Formula V with the disodium or dipotassium salt of Formula IV. The establishment of specific temperature conditions is not necessary. The reaction is not violently exothermic, and we have chosen merely to mix the reactants in the liquid ammonia vehicle used in preparation of the dimetallo salt, Formula IV, and to permit the ammonia to evaporate prior to recovering the product. Temperatures from about room temperature to as low as $-60°$ C. are operable. Use of liquid ammonia under conditions in which it is permitted to evaporate (ca. $-33°$ C.) is, however, convenient since this provides an inert atmosphere and serves to insulate the reaction mixture from the air.

The 3-aminoalkyl-3-arylindan-1-ol intermediates of Formula VI are produced as the monosodium or potassium salts, the anion thereof being the indanoxide corresponding in structure to Formula VI after removal of the alcoholic hydrogen atom. For recovery of the 3-aminoalkyl-3-arylindan-1-ol intermediate, the salt is neutralized or hydrolyzed by contacting with water or dilute acid. The hydrochloride or other acid addition salt may be formed, but in some instances caution must be exercised to avoid dehydration to the indene of Formula I, which may take place with great facility.

We have chosen related modes of operation for recovery and dehydration of the intermediate of Formula VI. After evaporation of the liquid ammonia, the reaction mixture is mixed with water and the 3-aminoalkyl-3-arylindan-1-ol of Formula VI is recovered from the organic solvent phase. It is, therefore, preferred to employ water immiscible organic solvents as diluents with the liquid ammonia during the reaction or for the recovery procedure. This facilitates recovery of the desired intermediate, since inorganic materials can then be washed from the reaction mixture with water.

If it is desired to recover the indanol of Formula VI as the free base, the organic solvent solution from which the inorganic and other water soluble materials have been removed by washing with water can be simply evaporated to eliminate the volatile solvent. If it is desired to recover the indanol of Formula VI as an acid addition salt, the organic solvent solution can be treated with a mineral acid, resulting in precipitation of the acid addition salt or alternatively the solvent extract can in turn be extracted with dilute aqueous mineral or other strong acid and the acid addition salt recovered from the aqueous extract, taking any precautions that may be required to prevent dehydration.

For dehydration of the indanol of Formula VI to the indene of Formula I, contact thereof with any of a variety of known dehydrating agents under dehydrating conditions is employed. We prefer to use a neutral dehydrating agent such as dimethyl sulfoxide or an acidic dehydrating agent such as a mineral acid or strong organic acid including the alkyl and arylsulfonic acids, methanesulfonic acid, benzenesulfonic acid, and p-toluene sulfonic acid. Phosphorus oxychloride, thionyl chloride, aluminum chloride, and $P_2O_5$ also are classed as acid dehydrating agents. Generally dehydration ocurs with ease and anhydrous conditions are not required. The variables of concentration, time, and temperature can be arranged with a minimum of experimentation to ascertain optimum conditions in a given circumstance.

One convenient and preferred mode of operation for the preparation of 1-(2-dimethylaminoethyl)-1-phenylindene and 1-(2-dimethylaminoethyl)-3-methyl-1-phenylindene is to simply heat an aqueous mineral acid solution of the acid addition salt of the indanol (Formula VI) for a period and at a temperature sufficient to effect dehydration. For example, we have found that heating a solution of 3-(2-dimethylaminoethyl)-3-phenylindan-1-ol hydrochloride in 6 N aqueous hydrochloric acid at 90° C. for about 2 hrs. results in complete dehydration without complication from competing side reactions or decompositions. On the other hand, 3-(2-dimethylaminoethyl)-1-methyl-3-phenylindan-1-ol hydrochloride dehydrates spontaneously at room temperature when contacted with an aqueous solution of 6 N hydrochloric acid.

The indanol intermediates of Formula IV employed in this process are known to the art. One convenient method for their preparation is by reaction of 3-arylindanone with a Grignard reagent, as is exemplified in J. Org. Chem. 18, 1237–45 (1953) for preparation of 1-methyl-3-phenylindan-1-ol. The indanols required wherein R¹ is H may be prepared by hydrogenation of the indanone with Raney nickel catalyst.

Various pharmacologic effects are elicited on adiministration of the indanols of Formula VI and their acid addition salts to animals. For example, 3-(2-dimethylaminoethyl)-3-phenylindan-1-ol hydrochloride and 3-(2-dimethylaminoethyl)-1-methyl-3phenylindan-1-ol hydrochloride are active in preventing the phenylquinone writhing syndrome in mice, a property common to analgesics (Hendershot and Forsaith, J. Pharmacol. Exptl. Therap. 125, 237 (1959), Kissel et al., ibid., 134, 332 (1961)). These same substances are effective in preventing reserpine-induced ptosis in mice which is a response evoked by anti-depressant drugs in the same test. The former substances on administration in a dose of 10 mg./kg. to an anesthetized dog causes marked hypotensive and intestinal relaxant effects. The acute $LD_{50}$ thereof in mice treated orally is in the range 500–1000 mg./kg.

The following examples illllustrate methods for the preparation of the indanols of Formula VI and their transformation by dehydration to the indene of Formula I according to the novel process of this invention.

EXAMPLE 1

3-(2-dimethylaminoethyl)-3-phenylindane-1-ol hydrochloride

A suspension of sodium amide in liquid ammonia is prepared by reacting 4.6 g. (0.2 g. atom) of sodium with 1 l. of liquid ammonia using a crystal of ferric nitrate to catalyze the process. A solution of 21 g. (0.1 mole) of 3-phenylindan-1-ol in 200 ml. of ether is then added in dropwise fashion. A blood red suspension of the disodium salt of the 3-phenylindan-1-ol immediately forms. A solution of 10.7 g. (0.1 mole) of 2-dimethylaminoethyl chloride in 11 ml. of xylene and 100 ml. of ether is then added. The red color is discharged on completion of the addition, signifying completion of the reaction. The liquid ammonia is permitted to evaporate and the residual ether suspension of 3-(2-dimethylaminoethyl)-3-phenylindan-1-ol sodium salt is mixed with 300 ml. of water, resulting in hydrolysis of the salt. The ether solution of 3-(2-dimethylaminoethyl)-3-phenylindan - 1 - ol is separated, washed with a further portion of water and then extracted into 6 N aqueous hydrochloric acid. The acid extract is cooled, neutralized with dilute sodium hydroxide, resulting in separation of 3-(2-dimethylaminoethyl)-3-phenylindan-1-ol as an oil. The oil is recovered by extraction with ether drying of the extract, and evaporation of the solvent. The residue is dissolved in ethanol and acidified with isopropanolic hydrogen chloride, resulting in formation of 3-(2-dimethylamino-ethyl)-3-phenylindan-1-ol hydrochloride as a white crystalline solid; yield, 20.0 g. (71%), M.P. 204–205° C. (dec.).

*Analysis.*—Calcd. for $C_{19}H_{23}NO \cdot HCl$ (percent): C, 71.79; H, 7.61; Cl, 11.16. Found (percent): C, 71.86; H, 7.81; Cl, 11.00.

The nuclear magnetic resonance spectrum measured on a deuterium oxide solution of the preceding sample of 3-(2-dimethylaminoethyl)-3-phenylindan-1-ol hydrochloride with sodium 3-(trimethylsilyl)-1-propanesulfonate as reference using a Varian A-60 NMR Spectrometer operating at 60 mc. provided the following data. These data confirm the assigned structure. The reference numbers for the proton groups refer to the structural formula drawn. The relative area observed in each instance is proportional to the number of protons of the group specified present in the test compound.

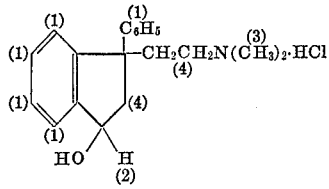

| Proton group | P.p.m. | Relative area |
| --- | --- | --- |
| Aromatic CH (1) | [1] 7.30 | 9 |
| OCH (2) | [2][3] 5.36 | 1 |
| N(CH₃)₂ (3) | [3] 2.72 | 12 |
| CH₂ (4) | | |

[1] Broad peak centered at this point.
[2] Doublet of doublets, total splitting, 13.0 cps.
[3] The character of these peaks suggests the presence of a stereoisomeric impurity.

EXAMPLE 2

1-(2-dimethylaminoethyl)-1-phenylindene hydrochloride

The procedure of Example 1 is repeated up to and including extraction of the ethereal solution of 3-(2-dimethylaminoethyl)-3-phenylindan-1-ol with aqueous hydrochloric acid. Approximately 30% smaller volumes of solvents are employed throughout. The acid extract is then heated at 90° C. for 2½ hrs., cooled, and neutralized with 40% aqueous sodium hydroxide. The precipitated oil is recovered by ether extraction, the extracts are dried, and the solvent removed by distillation. The residual 1-(2-dimethylaminoethyl)-1-phenylindene is dissolved in isopropanol and acidified with isopropanolic hydrogen chloride, resulting in precipitation of 3-(2-dimethylaminoethyl)-3-phenylindene hydrochloride, M.P. 198–199° C. In this run a 91% yield of product was obtained.

*Analysis.*—Calcd. for $C_{19}H_{21}N \cdot HCl$ (percent): C, 76.11; H, 7.40; N, 4.70; Cl, 11.79. Found (percent): C, 76.06; H, 7.48; N, 4.50; Cl, 12.06.

The nuclear magnetic resonance spectrum measured on a deuterium oxide solution of the preceding sample of 1-(2 - dimethylaminoethyl)-1-phenylindene hydrochloride with sodium 3-(trimethylsilyl)-1-propanesulfonate as reference using a Varian A–60 NMR Spectrometer operating at 60 mc. provided the following data. These data confirm the assigned structure. The reference numbers for the proton groups and the numbers tabulated for relative area have the same significance as before.

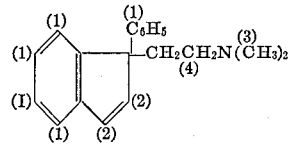

| Proton group | P.p.m. | Relative area |
| --- | --- | --- |
| Aromatic CH (1) | [1] 7.28 | 9 |
| Vinyl CH (2) | [2] 6.87 | 1 |
| | [2] 6.54 | 1 |
| N(CH₃)₂ (3) | [3] 2.65 | 10 |
| —CH₂CH₂— (4) | [4] 2.65 | |

[1] Broad peak centered at this point.
[2] Pair of doublets J=5.7 cps.
[3] Sharp peak.
[4] Broad peak.

EXAMPLE 3

Reaction employing potassium salt

The procedure of Example 2 is repeated employing potassium amide prepared by reacting potassium with liquid ammonia in the same molecular proportion as sodium amide. The identical product is obtained in substantially the same yield as specified in that example employing the same recovery and purification procedure.

EXAMPLE 4

3-(2-dimethylaminoethyl)-1-methyl-3-phenylindan-1-ol α-isomer

A suspension of sodium amide is prepared from 5.7 g. (0.25 g. atom) of sodium and 1.0 l. of liquid ammonia as before. A solution of 22.4 g (0.1 mole) of 1-methyl-3-phenylindan-1-ol in 200 ml. of anhydrous ether is then added dropwise thereto during a period of 40 min. with stirring. A bright red suspension of the disodium salt of the 1-methyl-3-phenylindan-1-ol forms at once, but gradually darkens in color. Addition of a solution of 16.0 g. (0.15 mole) of 2-dimethylaminoethyl chloride in 20 ml. of xylene and 100 ml. of anhydrous ether is then completed during a period of 1 hr. The mixture is stirred while the ammonia is permitted to evaporate, and the mixture warms to room temperature. The sodium salt of 3-(2-dimethylaminoethyl)-1-methyl-3-phenylindan-1-ol is then neutralized by the gradual addition of 200 ml. of water. The layers are separated and the aqueous layer washed with ether. The combined ether solutions are then dried over magnesium sulfate and the solvent removed by distillation at reduced pressure. 3-(2-dimethylaminoethyl-1-methyl-3-phenylindan-1-ol is obtained as a residual yellow oil. The identity of this product has been confirmed by inspection of its ultraviolet absorption and nuclear magnetic resonance spectra. It proved to be a mixture of diastereoisomers of the named substance, one of which crystallized on standing. The crystaline isomer was separated by trituration of the partially crystalline oil with hexane, yield, 10 g., M.P. 89–94° C., which was raised to 92–94° C. on twice recrystallizing from hexane.

*Analysis.*—Calcd. for $C_{20}H_{25}NO$ (percent): C, 81.31; H, 8.53; N, 4.74. Found (percent): C, 81.62; H, 8.65; N, 4.70.

EXAMPLE 5

3-(2-dimethylaminoethyl)-1-methyl-3-phenylindan-1-ol hydrochloride β-isomer

The solvent was evaporated from the hexane filtrate from trituration of the mixed diastereoisomeric bases in Example 4, the residual oil dissolved in 100 ml. of acetone, and acidified with methanolic hydrogen chloride. 3-(2-dimethylaminoethyl) - 1 - methyl - 3 - phenylindan-1-ol hydrochloride, β-isomer, precipitated as a white crystalline solid. The suspension was concentrated by evaporation and 4.8 g. of product collected. This material was recrystallized from acetone-methanol, M.P. 179–180° C. (dec.).

*Analysis.*—Calcd. for $C_{20}H_{25}NO \cdot HCl$ (percent): C, 72.37; H, 7.89; N, 4.22; Cl, 10.68. Found (percent): C, 72.06; H, 7.71; N, 4.08; Cl, 10.68.

EXAMPLE 6

1-(2-dimethylaminoethyl)-3-methyl-1-phenylindene hydrochloride 3-(2-dimethylaminoethyl)-1 - methyl - 3 - phenylindan-1-ol, 2.89 g., is dissolved in anhydrous ether and gaseous hydrogen chloride is dissolved therein until a strongly acidic solution results. Dehydration of the indanol occurs spontaneously. Sufficient acetone is then added to dissolve any precipitated material and then more ether is added to induce crystallization. The dehydrated product, 1-(2-dimethylaminoethyl)-3-methyl-1 - phenylindene hydrochloride, precipitates and is collected on a filter, weight 1.8 g., M.P. 207–208° C.

*Analysis.*—Calcd. for $C_{20}H_{23}N \cdot HCl$ (percent): C, 76.52; H, 7.70; Cl, 11.29. Found (percent): C, 76.81; H, 7.57; Cl, 11.43.

EXAMPLES 7–8

The procedure of Example 4 is modified by substituting a chemically equivalent amount of each of the aminoalkyl esters listed in Table I for the 2-dimethylaminoethyl chloride specified in Example 4. The resulting 3-(aminoalkyl)-1-methyl-3-phenylindan-1-ols obtained which are also listed in Table I are dehydrated to indenes as in Example 6. The latter may then be hydrogenated to indanes as is disclosed in the Ueberwasser patent, U.S. 2,798,888.

TABLE I.—EXAMPLES 7–8

| Example No. | Aminoalkyl Ester | Aminoalkylindanol |
|---|---|---|
| 7 | 2-diethylaminoethyl chloride. | 3-(2-diethylaminoethyl)-1-methyl-3-phenylindan-1-ol |
| 8 | 3-dimethylaminopropyl chloride. | 3-(3-dimethylaminopropyl)-1-methyl-3-phenylindan-1-ol. |

EXAMPLES 9–12

The procedure of Example 4 is modified by substituting a chemically equivalent amount of each indanol listed in Table II for the 1-methyl-3-phenylindan-1-ol specified in Example 4. These indanols are prepared from the corresponding 3-phenylindanones by reaction with methyl magnesium bromide as is desired in J. Org. Chem. 18, 1237–45 (1953). The resulting substituted 3-(2-dimethylaminoethyl)-1-methylindan-1-ols are then dehydrated to the corresponding indenes substantially as described in Examples 2 or 6 to provide the corresponding indenes. The latter may then be hydrogenated by the method referred to above to provide the corresponding indanes. The corresponding 1-phenylindanol reactants may be prepared from the same indanones by using phenyl magnesium bromide in the Grignard preparation. These then provide analogous 3-(2-dimethylaminoethyl)-1-phenylindanol products.

TABLE II.—EXAMPLES 9–12

| Example No. | Indanol | 3-(2-dimethylaminoethyl) indanols |
|---|---|---|
| 9 | 5,6-dimethoxy-1-methyl-3-phenylindan-1-ol. | 5,6-dimethoxy-3-(2-dimethylaminoethyl)-1-methyl-3-phenyl-indan-1-ol. |
| 10 | 5,6-dimethoxy-3-(3',4'-dimethoxyphenyl)-1-methylindan-1-ol. | 5,6-dimethoxy-3-(3',4'-dimethoxyphenyl)-3-(2-dimethylaminoethyl)-1-methylindan-1-ol. |
| 11 | 3-(2'-chlorophenyl)-1-methylindan-1-ol. | 3-(2'-chlorophenyl)-3-(2-dimethylaminoethyl)-1-methylindan-1-ol. |
| 12 | 3-(4'-chlorophenyl)-1-methylindan-1-ol. | 3-(4'-chlorophenyl)-3-(2-dimethylaminoethyl)-1-methylindan-1-ol. |

Other 3-phenylindan-1-ols bearing methyl, chloro, bromo, or methoxy groups in ether or both of the phenyl or indane rings may be prepared from the corresponding indanone by reduction to the indanol or reaction with a Grignard reagent as described.

In Formula I, $R^4$ is hydrogen, a single chloro, bromo, alkyl, or alkoxy group of up to four carbon atoms located in the 4, 5, 6, or 7-positions of the indene ring, or two alkoxy groups, each having up to four carbon atoms located in the 4, 5, 6, or 7-positions.

What is claimed is:

1. The process for the preparation of the 1-aminoalkyl-1-arylindene of the formula

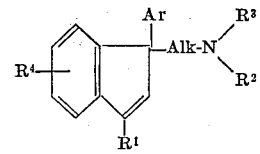

wherein

Ar is phenyl, halophenyl, alkylphenyl, dialkylphenyl, alkoxyphenyl, or dialkoxyphenyl having up to four carbon atoms in the alkyl or alkoxy groups, $R^1$ is hydrogen, phenyl, or alkyl having up to about six carbon atoms, Alk is an alkylene group of two to three carbon atoms having two to three carbon atoms separating the nitrogen atom from the ring, $R^2$ and $R^3$ are alkyl groups having up to six carbon atoms, R⁴ is hydrogen, chloro, bromo, alkyl, alkoxy, or dialkoxy having up to four carbon atoms,
which comprises (1) reacting a dimetallo salt selected from sodium and potassium of the 3-arylindan-1-ol of the formula

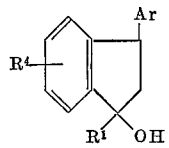

with one molecular proportion of an aminoalkyl reactive ester of the formula

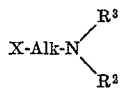

wherein $R^1$, $R^2$, $R^3$, $R^4$, Ar and Alk have the same meaning as above and X is chloro, bromo, iodo, alkylsulfonate, or arylsulfonate in a reacting inert solvent in contact with a reaction inert atmosphere at a temperature of from about room temperature to about −60° C. under anhydrous conditions, (2) thereafter neutralizing or hydrolyzing resulting sodium or potassium salt of the 3-aminoalkyl-3-arylindan-1-ol of the formula

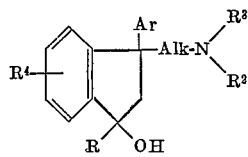

wherein $R^1$, $R^2$, $R^3$, $R^4$, Ar and Alk have the same meaning as above, and (3) dehydrating resulting 3-aminoalkyl-3-arylindan-1-ol.

2. The 3-aminoalkyl-3-arylindan-1-ol having the formula

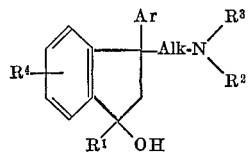

wherein $R^1$, $R^2$, $R^3$, $R^4$, Ar and Alk, have the same meaning as in claim 1, the acid addition salts thereof, and the sodium and potassium salts thereof.

3. The compound 3-(2-dimethylaminoethyl)-3-phenyl-indan-1-ol.

4. The hydrochloride salt of the compound of claim 3.

5. The compound 1-methyl-3-phenyl-3-(2-dimethylaminoethyl)-indan-1-ol.

6. The hydrochloride salt of the compound of claim 5.

7. The process for the preparation of the compounds claimed in claim 2 which comprises reacting the disodium or dipotassium salt of a compound of the formula

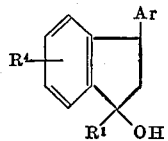

with one molecular proportion of an aminoalkyl reactive ester of the formula

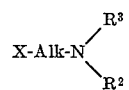

wherein $R^1$, $R^2$, $R^3$, $R^4$, Ar and Alk have the same meaning as in claim 2 and X is chloro, bromo, ido, alkylsulfonate, or arylsulfonate in a reaction inert solvent and in contact with a reaction inert atmosphere at a temperature of from about room temperature to about −60° C. under anhydrous conditions.

8. The process of claim 7 wherein 3-phenylindan-1-ol disodium or dipotassium salt and a 2-dimethylaminoethyl reactive ester are employed.

9. The process of claim 8 wherein said disodium or dipotassium salt is formed by reaction in liquid ammonia of 2 molecular proportions of sodium amide or potassium amide with 1 molecular proportion of 3-phenylindan-1-ol and thereafter one molecular proportion of a 2-dimethylaminoethyl halide selected from chloride, bromide, or iodide is reacted therewith, resulting in formation of 3-(2-dimethylaminoethyl)-3-phenylindan-1-ol sodium or potassium salt.

10. The process of claim 9 wherein said 2-dimethylaminoethyl halide is dissolved in a reaction inert water immiscible organic solvent prior to mixing with the liquid ammonia suspension; the liquid ammonia is allowed to evaporate after reaction of the 2-dimethylaminoethyl halide; and resulting 3-(2-dimethylaminoethyl)-3-phenylindan-1-ol sodium or potassium salt is hydrolyzed by reaction with water or aqueous mineral acid, thereby producing 3-(2-dimethylaminoethyl)-3-phenyl-1-indanol or the mineral acid addition salt thereof.

11. The process of claim 10 wherein aqueous mineral acid is employed to hydrolyze said 3-(2-dimethylaminoethyl)-3-phenylindan-1-ol sodium or potassium salt and resulting aqueous mineral acid solution is heated sufficiently to result in dehydration of said indanol resulting in formation of 1-(2-dimethylaminoethyl)-1-phenylindene mineral acid salt.

References Cited

UNITED STATES PATENTS

| | | | |
|---|---|---|---|
| 2,441,069 | 5/1948 | Hoffmann et al. | 260—293 |
| 2,798,888 | 7/1957 | Ueberwasser | 260—570.8 |
| 2,884,456 | 4/1959 | Campbell | 260—570.8 |
| 3,384,662 | 5/1968 | Hollinger et al. | 260—570 |
| 3,419,560 | 12/1968 | Bernstein et al. | 260—570.5 X |
| 3,429,921 | 2/1969 | Hjelte et al. | 260—570.8 X |

FOREIGN PATENTS 928,808  6/1963  Great Britain.

OTHER REFERENCES

Hawser et al.: "Journal Organic Chemistry," vol. 23, pp. 916–18 (1958).

ROBERT V. HINES, Primary Examiner

U.S. Cl. X.R.

260—247, 247.7, 293, 294.7, 326.5, 326.81, 456, 590, 612, 621, 623, 501.18; 424—248, 267, 274, 330

UNITED STATES PATENT OFFICE
CERTIFICATE OF CORRECTION

Patent No. 3,504,031    Dated March 31, 1970

Inventor(s) JAMES M. BERDAHL and ROBERT F. MAJEWSKI

It is certified that error appears in the above-identified patent and that said Letters Patent are hereby corrected as shown below:

Col. 1, line 20, delete "or";

Col. 2, line 41, before "(tosylate)" insert such as Cl, Br, alkylsulfonate (mesylate), or arylsulfonate Col. 2, line 61, delete "such as Cl, Br, alkylsulfonate (mesylate), or arylsulfonate"

Col. 4, line 56, "acid" should be acidic

Col. 4, line 57, "ocurs" should be occurs

Col. 5, lines 22 and 23, "substances" should be substance

Col. 5, line 57, place a comma after "ether"

Col. 7, line 23, insert a parenthesis after "dimethylaminoethyl"

Col. 7, line 29, "crystaline" should be crystalline

Col. 8, line 19, "desired" should be described

Col. 8, line 45, "ether" should be either

Col. 9, lines 19 and 20, "meanin" should be meaning

Col. 9, line 21, "reacting" should be reaction

Col. 10, line 8, "ido" should be iodo

SIGNED AND SEALED

SEP 15 1970

(SEAL)
Attest:

Edward M. Fletcher, Jr.
Attesting Officer

WILLIAM E. SCHUYLER, JR.
Commissioner of Patents